Jan. 2, 1951 W. J. FAULKNER 2,536,432

RECORD CHANGER

Filed Sept. 23, 1944 10 Sheets-Sheet 1

INVENTOR
WILLARD J. FAULKNER
BY Richey & Watts
ATTORNEYS

INVENTOR
WILLARD J. FAULKNER
BY Richey & Watts
ATTORNEYS

Jan. 2, 1951 W. J. FAULKNER 2,536,432

RECORD CHANGER

Filed Sept. 23, 1944 10 Sheets-Sheet 3

INVENTOR

WILLARD J. FAULKNER

BY Richey & Watts

ATTORNEYS

INVENTOR
WILLARD J. FAULKNER
BY Richey & Watts
ATTORNEYS

Jan. 2, 1951 W. J. FAULKNER 2,536,432

RECORD CHANGER

Filed Sept. 23, 1944 10 Sheets-Sheet 5

INVENTOR
WILLARD J. FAULKNER
BY Richey & Watts
ATTORNEYS

INVENTOR
WILLARD J. FAULKNER

BY Richey & Watts

ATTORNEYS

Jan. 2, 1951 W. J. FAULKNER 2,536,432

RECORD CHANGER

Filed Sept. 23, 1944 10 Sheets-Sheet 7

INVENTOR
WILLARD J. FAULKNER
BY Richey & Watts
ATTORNEYS

INVENTOR
WILLARD J. FAULKNER
BY Richey & Watts
ATTORNEYS

Jan. 2, 1951

W. J. FAULKNER

RECORD CHANGER 2,536,432

Filed Sept. 23, 1944

10 Sheets-Sheet 9

INVENTOR
WILLARD J. FAULKNER

BY Richey & Watts

ATTORNEYS

INVENTOR.
WILLARD J. FAULKNER
BY Richey & Watts
ATTORNEYS

Patented Jan. 2, 1951

2,536,432

UNITED STATES PATENT OFFICE 2,536,432

RECORD CHANGER

Willard J. Faulkner, Chicago, Ill., assignor to Admiral Corporation, Chicago, Ill., a corporation of Delaware Application September 23, 1944, Serial No. 555,413

12 Claims. (Cl. 274—10)

This invention relates to record players and more particularly to a record player of the so-called automatic type.

The present invention contemplates a structure wherein a rotatable turntable is provided with means for supporting records in a stack above the turntable and dropping them one by one onto the turntable. The records are supported by a stationary spindle located at the center of the turntable which is provided with a shoulder for engaging the unplayed records adjacent the center hole, and by a side support at the edge of the turntable for supporting the records adjacent their edges. The side support also has an ejector for engaging the bottom-most record of the stack and sliding it off its supports, allowing it to drop onto the turntable in playing position. It also contemplates means, cooperating with the foregoing in timed relation thereto, to move the tone arm out of the way when the record is dropping.

Although mechanisms of the general class described have heretofore been contemplated, there have been numerous disadvantages inherent in the previous structures which it is one of the purposes of the present invention to overcome. Previous structures were relatively complicated, requiring a considerable number of parts which were expensive to manufacture. Prior machines of this character were difficult to maintain in service as well as difficult to properly adjust for handling of the records.

One particular disadvantage of the prior art was that they were nearly always placed in the hands of persons inexperienced in the mechanical matters and who did not understand their operation, and therefore, were easily thrown out of adjustment or broken because of the carelessness in which they were handled.

By the present invention I have provided a record changer which is extremely simple in its operation, has but a few moving parts, and where the adjustment for its operation is so simple as to make it possible for it to be adjusted to properly handle the records by persons with relatively little experience. Still another advantage of the present device is that its construction is such that no matter how it is handled it is practically impossible for a person, without deliberate intention, to do anything during the normal course of operation which will disturb its adjustment or render the same inoperative. Because of its simplicity, it is economical to manufacture.

Furthermore, by the present invention the handling of the record is effected in such a manner that relatively large tolerance of thickness may be allowed and still the functioning of the apparatus to handle the record is not affected.

Another advantage resides in the ability of the machine to handle warped records, and the construction is such that it is substantially impossible for the machine to break the records.

Still other advantages of the invention and the invention itself will become more apparent from the following description of an embodiment thereof which description is illustrated by the accompanying drawings and forms a part of this specification.

Figure 1:
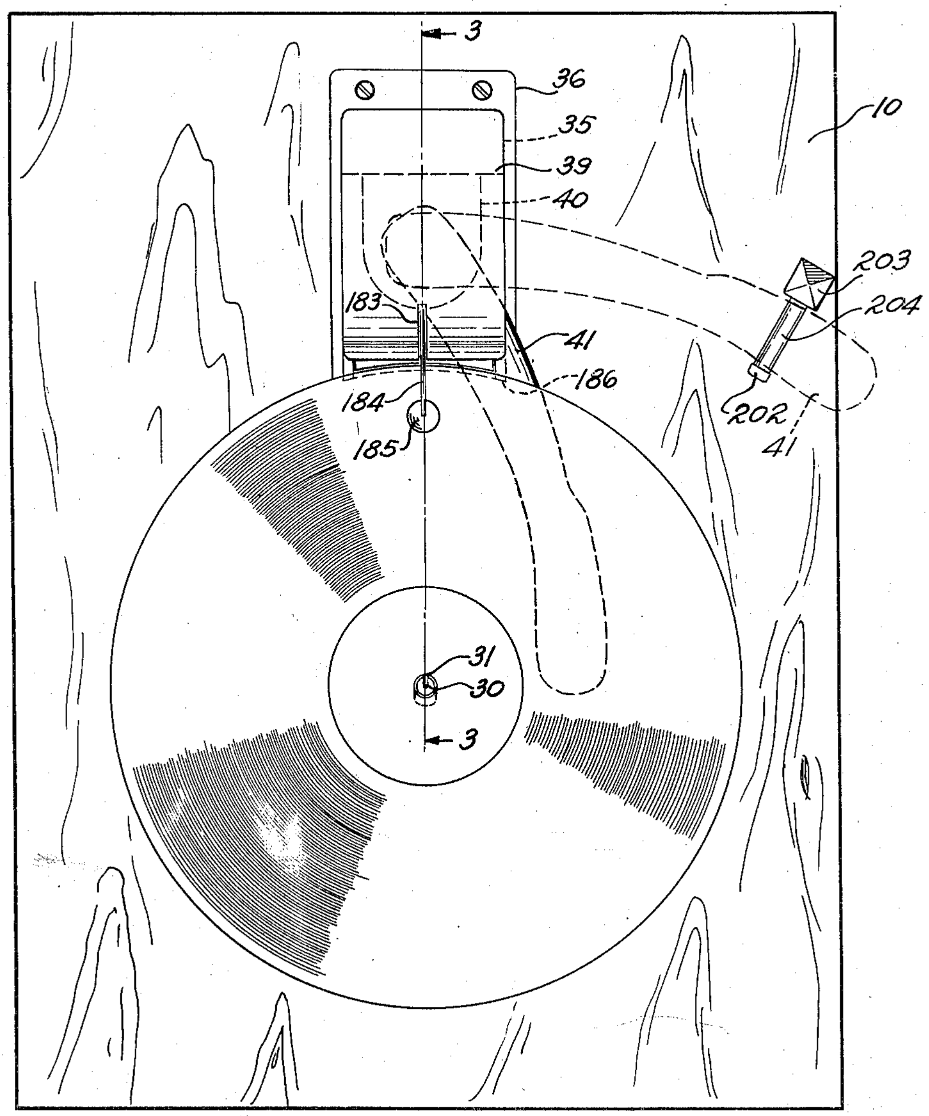
Fig. 1 is a plan view of a record changer of my invention showing a record thereon and with the tone arm being shown in playing position, the parts connected by the mechanism being shown in dashed lines, and also with the tone arm illustrated in a rest position by dash lines.
Figures 2, 2A:
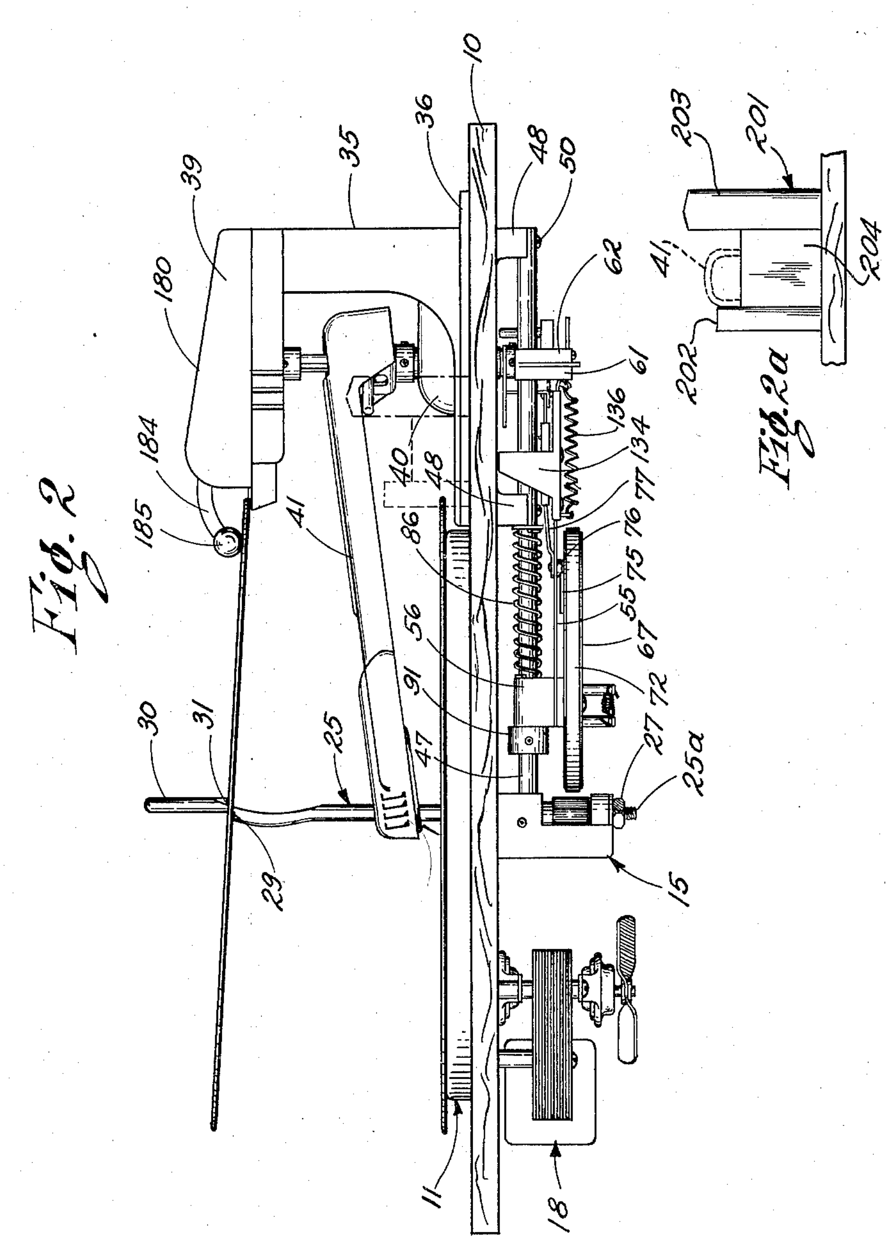
Fig. 2 is a side elevational view of the record changer of Fig. 1 with the tone arm being shown in playing position; and with the tone arm holder being shown in phantom.
Figure 3:
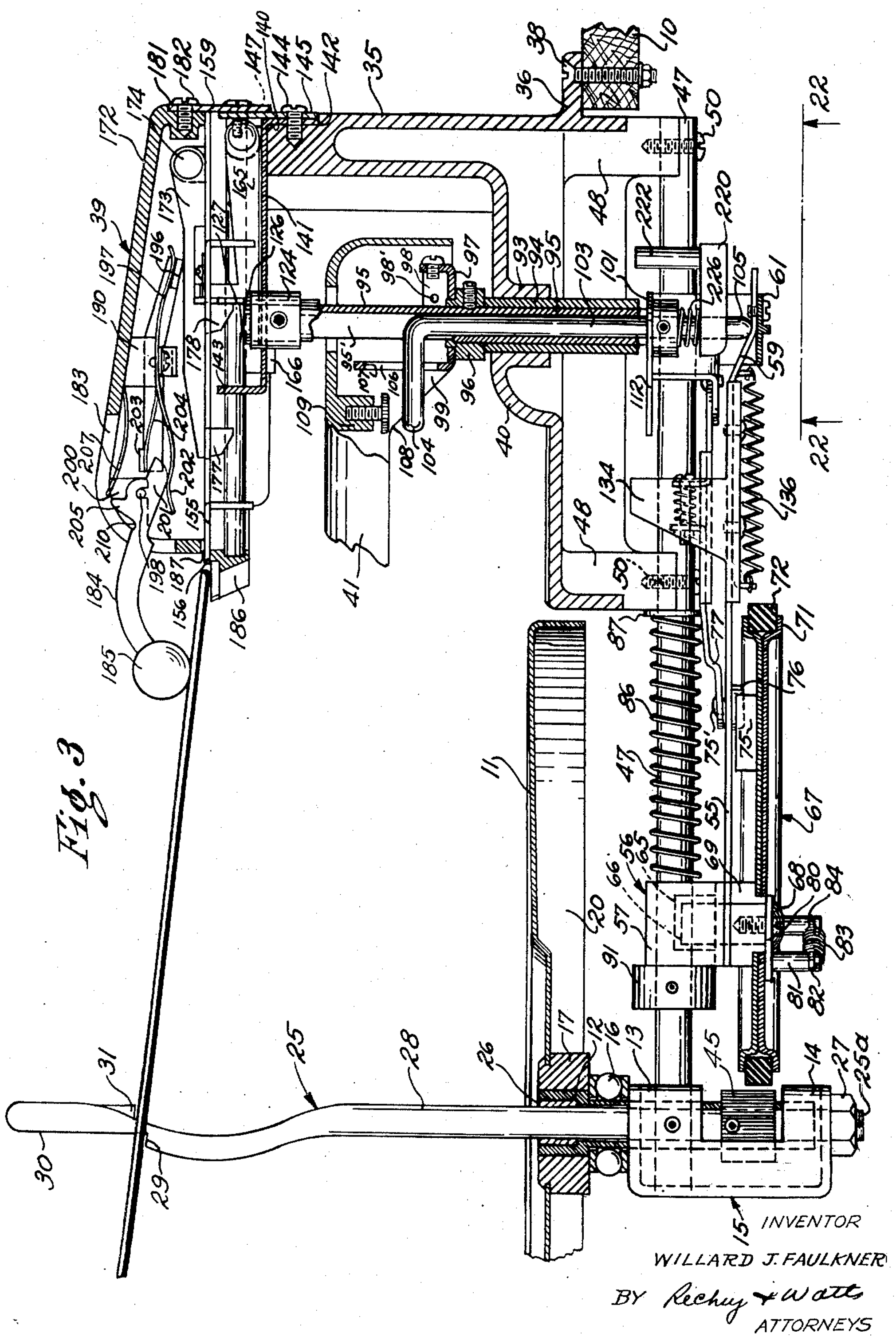
Figures 4, 14:
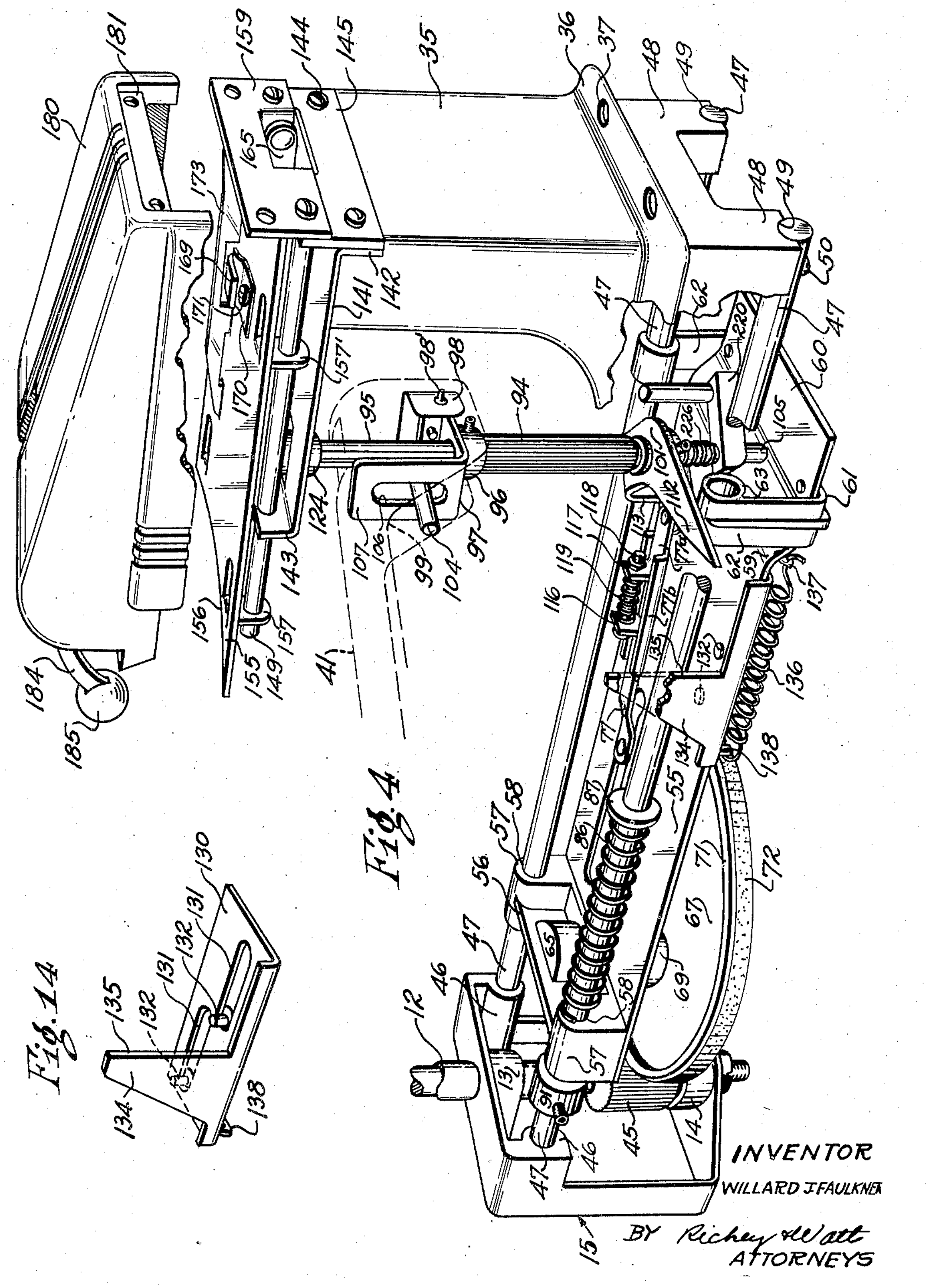
Figure 5:
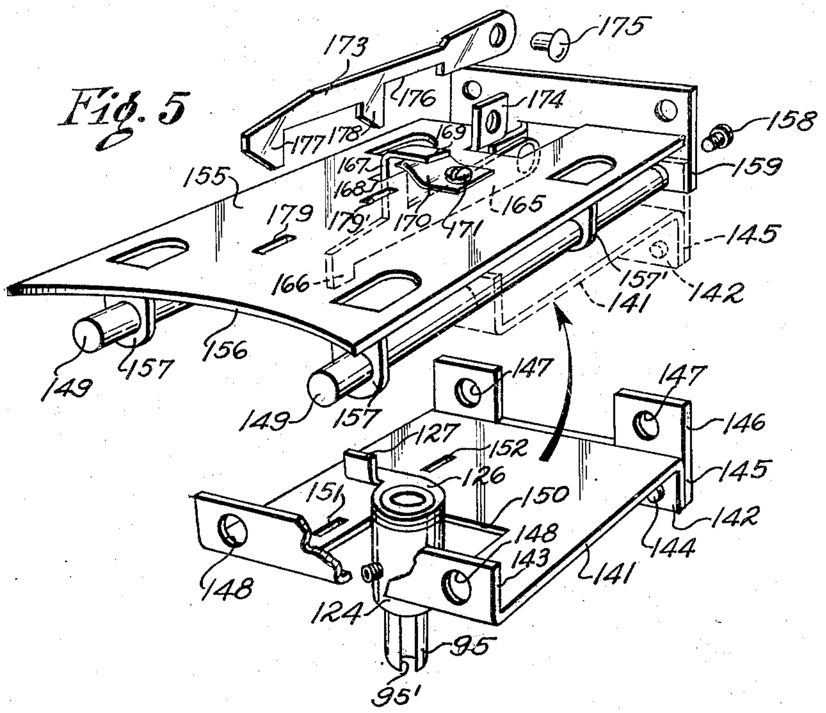
Figure 6:
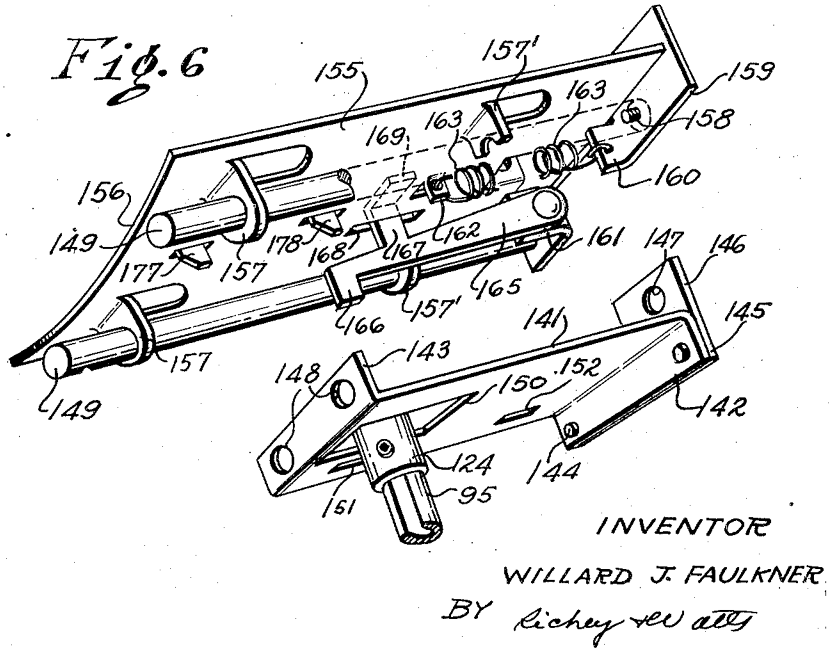
Figure 7:
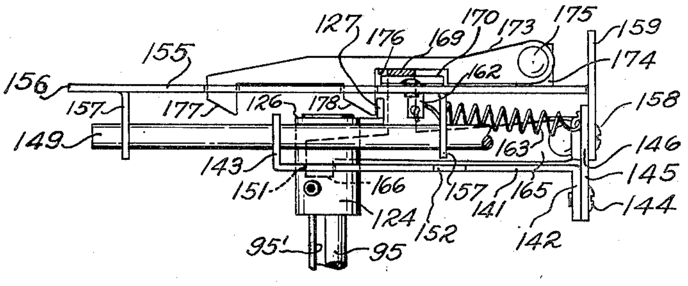
Figure 8:
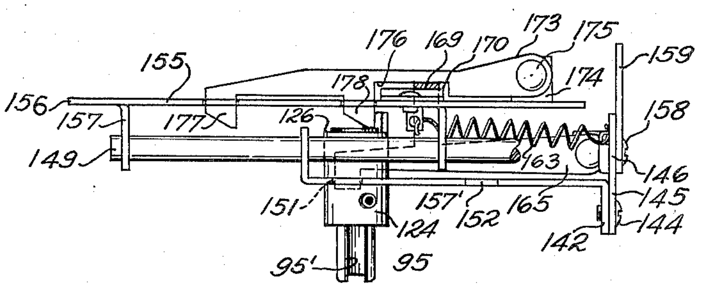
Figure 9:
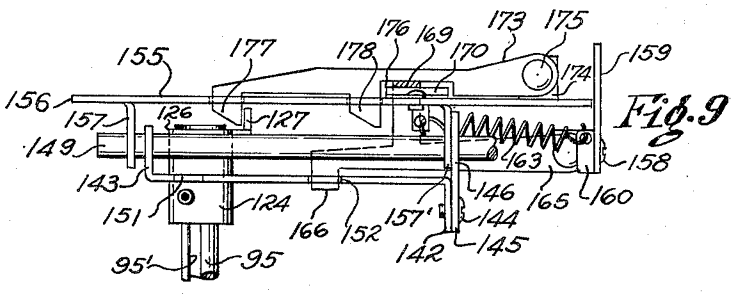
Figure 10:
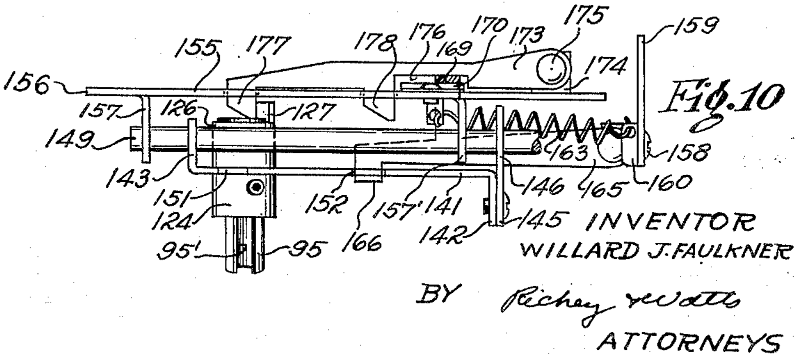
Figure 11:
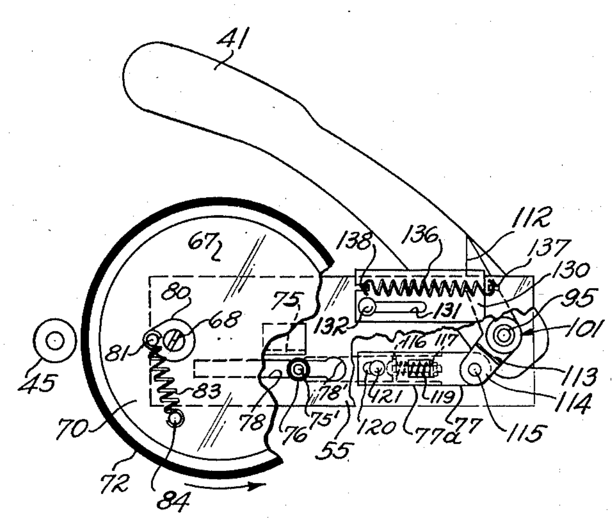
Figures 12, 13:
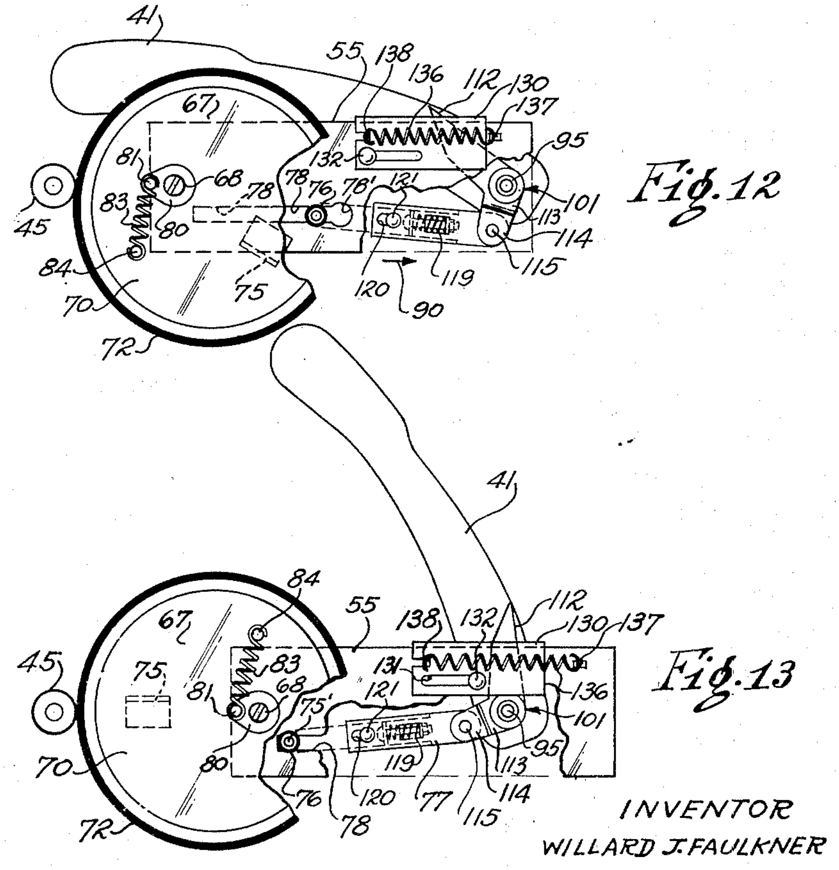
Figure 15:
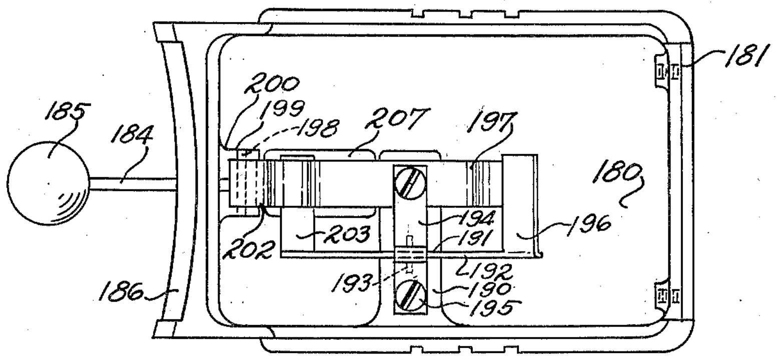
Figure 16:
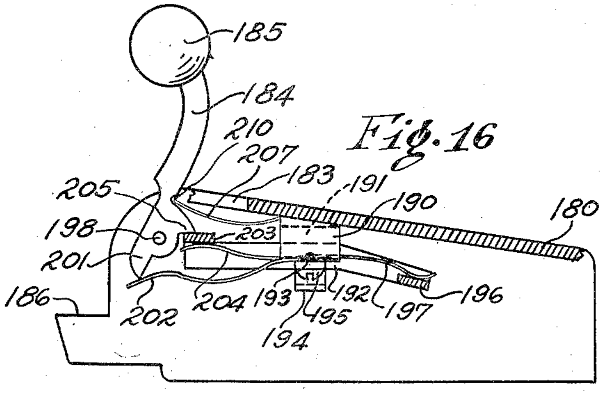
Figure 17:
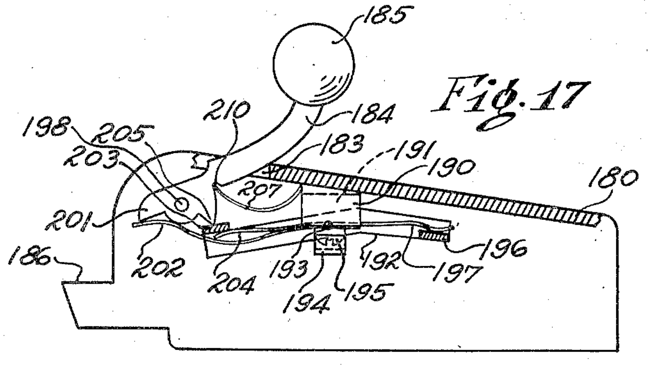
Figures 18, 19:
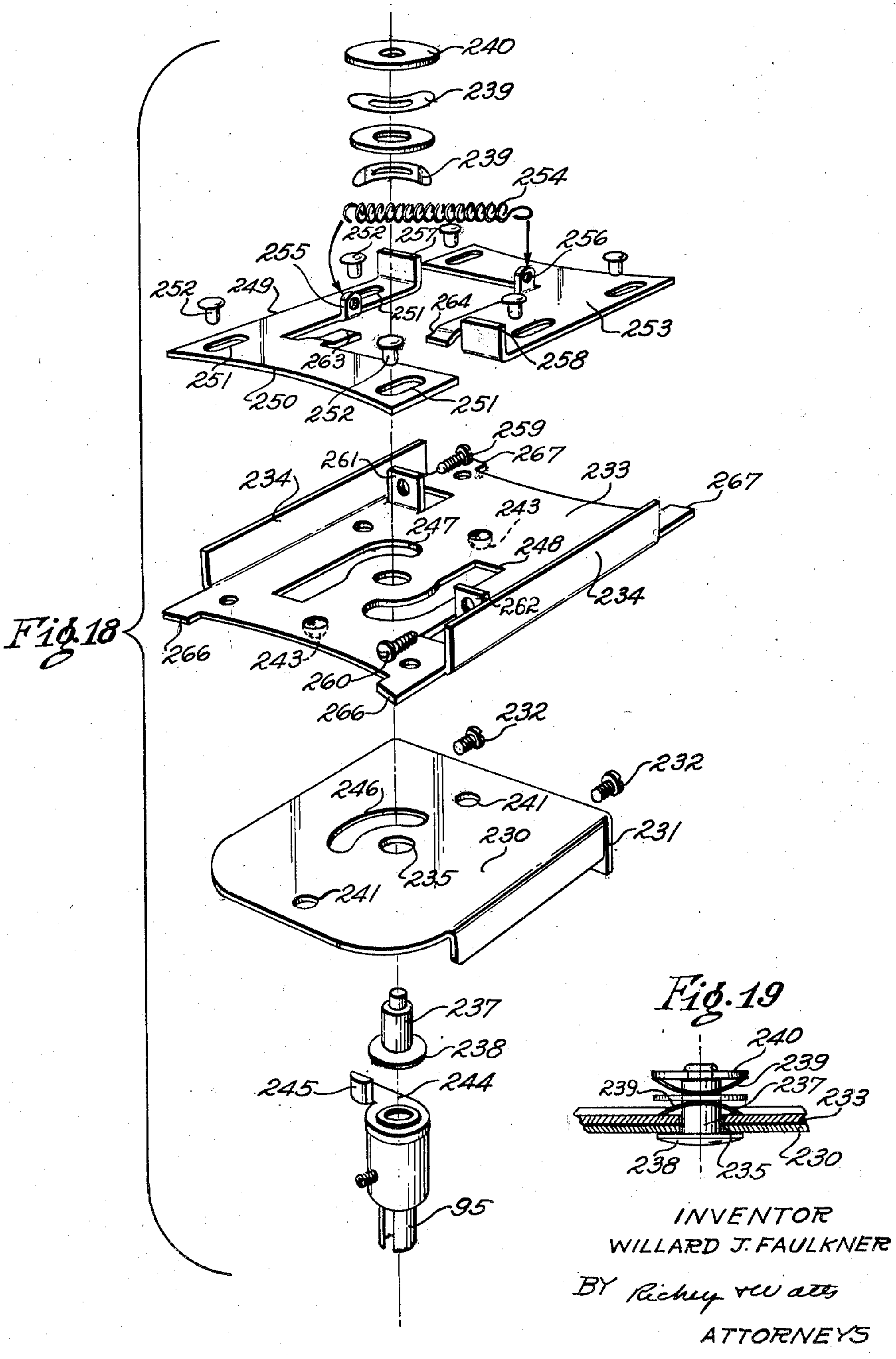
Figures 20, 21, 21A:
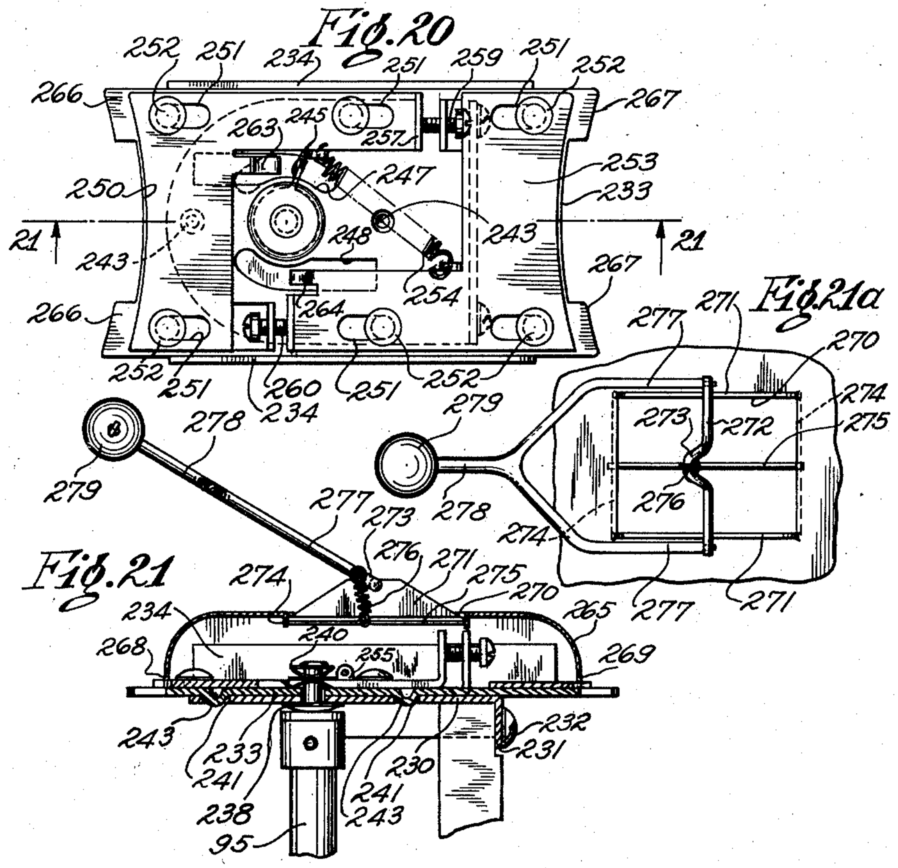
Figure 22:
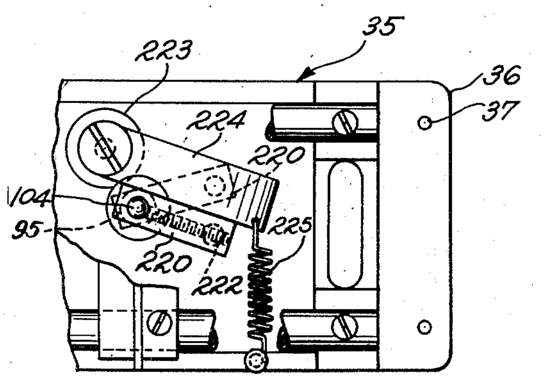
Figure 23:
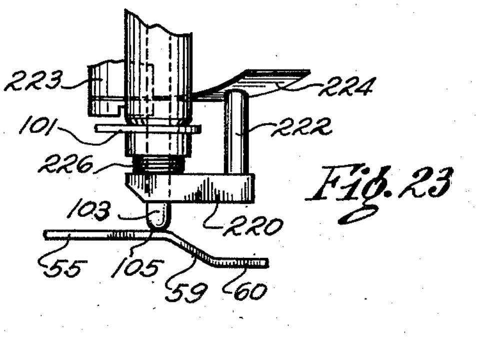

Fig. 2*a* is an elevational view of the tone arm holder;

Fig. 3 is a fragmentary enlarged vertical medial section taken from a plane indicated by the line 3—3 of Fig. 1;

Fig. 4 is an enlarged perspective view of the record changer mechanism without its supporting base with certain parts broken away to better disclose what would otherwise be hidden and with certain parts displaced or shown in exploded position and with the tone arm shown in phantom;

Fig. 5 is an exploded perspective view of the record ejector mechanism showing the upper surface of the parts and with certain parts being broken away to show the otherwise hidden parts;

Fig. 6 is a similar view showing the underside of the same mechanism;

Fig. 7 is a side elevational view showing the ejector mechanism of Figs. 5 and 6 assembled and illustrating the position taken by the parts prior to the ejection of a 10-inch record;

Fig. 8 is a view similar to Fig. 7 illustrating the position taken during the ejection of a 10-inch record;

Figs. 9 and 10 are views similar to Figs. 7 and 8 but showing the apparatus and the positions taken during the ejection of a 12-inch record;

Fig. 11 is a diagrammatic bottom plan view with certain parts broken away showing the drive spindle for the record changing mechanism, the cam slide and the cam wheel and its manner of connection with the tone arm, the parts being shown in the position taken during the playing of the record and prior to the release at the end of the playing of the record;

Fig. 12 is a similar view of the position taken by the parts at the time that the tone arm has reached the end of its travel and the start of the record changing cycle;

Fig. 13 is a similar view showing the position taken by the parts at the heights of their travel;

Fig. 14 is a perspective view of the tone arm operating member removed from the slide;

Fig. 15 is a bottom plan view of the ejector head housing;

Fig. 16 is a fragmentary section showing an alternative position taken by the parts in the ejector housing;

Fig. 17 is another view similar to Fig. 16 showing still another position taken by the parts;

Fig. 18 is an exploded view of another type of ejector head;

Fig. 19 is a fragmentary vertical section of certain parts of the head of Fig. 18, in assembled position;

Fig. 20 is a top plan view of the head of Fig. 18 with the cover removed;

Fig. 21 is a vertical medial section thereof taken on the line 21—21 of Fig. 20;

Fig. 21*a* is a fragmentary plan view of Fig. 21;

Fig. 22 is a fragmentary bottom plan view taken from a plane indicated by the line 22—22 of Fig. 3;

Fig. 23 is a fragmentary side elevation of certain parts shown in Fig. 22.

Referring to the figures of the drawings throughout which like parts have been designated by like reference characters and particularly to Figs. 1 and 2 there is shown a base 10 which is depicted in the drawings as being made of wood. The base, however, can be made of metal or plastic. The device about to be described is so constructed that it can be installed in existing cabinets by providing a relatively simple opening therethrough. A turntable 11 is provided, being supported on a spindle 12 which spindle is mounted in bearings 13 and 14 in a support member 15. A thrust bearing 16 is interposed between the hub 17 for the turntable and the top of the housing 15. The turntable is driven by a motor 18 which drives a rubber-rimmed idler wheel, not shown, disposed in engagement with the inside of the rim 20 of the turntable. The drive to the rim is well known to those versed in the art and no further description thereof will be necessary. Other drives than that shown may be used however with equal effectiveness with the invention. One such drive contemplates a direct or gear connection to the rotatable spindle 12.

A stationary spindle 25 is provided and may be of the type and structure disclosed in my copending application, Serial No. 493,242, filed July 2, 1943, now Patent No. 2,498,333, issued February 21, 1950. The stationary spindle extends through the hollow spindle 12 which spindle is provided with bearings or guides 26 and extends through the bottom of the housing 15, being held immovably therein by a nut 27 disposed on the threaded end 25*a*. The stationary spindle extends upward from the turntable coaxial therewith, being provided with a guide portion 28 for guiding the records onto the turntable. The upper end is provided with a shoulder 29 upon which the stack of records may rest. It also has an offset stack-holding portion 30 for holding the unplayed records, in which is slidably disposed the leaf 31 for holding the records in their proper alignment on the stack, the structure of which is more clearly described in the aforementioned copending application.

The support for the edges of the records, which really supports the records in a zone at their edges, is disposed to one side of the turntable and comprises a pedestal 35, as best shown in Figs. 3 and 4, which is provided with a peripheral flange 36 that engages the top of the base 10. The flange is provided with openings through which screws or bolts 38 may extend for securing it to the base. The upper end of the pedestal carries a head 39 which incloses the ejector mechanism and record support and which will hereinafter be more fully described.

The pedestal is provided at its lower end with a portion 40 which supports the tone arm carrying mechanism, and the tone or pickup arm 41 is disposed on its supporting mechanism between the base 40 and the ejector head 39.

It is believed that a short description of the general operation of the device at this point will materially assist in a better understanding. The unplayed records are stacked on the spindle and the ejector support and one of the records is released to fall on the turntable. The manner of its release will hereinafter be more fully described. As the record is played in the usual manner the tone arm traverses the record towards the stationary spindle until it finishes playing the record and reaches the runout groove in the center of the record. At this time the record changing mechanism is tripped, which causes the tone arm to be; first, raised from the record; second, swung laterally clear of the record to one side of the turntable; third, a new record is ejected from the stack and drops upon the last played record; fourth, the tone arm is swung inward to the proper playing position; fifth, the tone arm is lowered gently onto the record into the start of the playing grooves, which ends the record changing cycle. The newly deposited record is then played until the tone arm again reaches the runout groove, after which the cycle is repeated.

The changer contemplates an assembly which may be assembled prior to installation in the base 10. The spindle support 15, as best shown in Fig. 4, is substantially rectangular in formation, being generally hollow and provided with top, side and bottom walls carrying the aligned bearings 13 and 14 for the rotatable spindle which is journalled in the bearings. A drive hub 45 having a serrated surface is secured to the spindle adjacent the lower bearing. The serrated surface provides for a good frictional engagement with the eccentric wheel carried by the cam slide hereinafter more fully described. The housing is also provided with a pair of bosses 46 (Fig. 4) in which are secured rods 47 that constitute a supporting frame and ways for the cam slide and its associated mechanism. The rods extend from the housing 15 in spaced horizontal parallel relation and are secured to legs 48 which extend downward from the base of the pedestal 35. The rods are seated in semi-cylindrical grooves 49 disposed in the bottom of the legs and held therein by screws 50 that extend through the rods into the legs. The pedestal and the housing 15 are thus connected in properly spaced relation to each other and as previously stated the rods provide a bed or ways for supporting the cam slide mechanism.

The means for effecting the changing of the record comprises a cam slide, slidably jornalled on the rods and carrying the cams for engagement with the tone arm and for operating the record ejecting mechanism. This slide is operated by the movement of a wheel which is eccentrically carried thereby and which has a rim for engagement with the serrated hub 45.

The slide comprises a plate 55 suspended from brackets 56 and 61 that are slidably journalled on the rods 47. The bracket 56 has upwardly extending bosses 57 provided with parallel openings 58 and is slidably journalled on the rods 47. The bracket 61 is secured to the lower portion 60 of the slide and includes upwardly extending arms 62 provided with bearings 63 which are slidably journalled on the rods 47 and supports the other end of the slide. The slide is thus supported for reciprocatory motion below the rods 47. The body of the slide, which as previously stated constitutes a generally rectangular plate 55, is provided with a downwardly slanting or curved portion 59 extending transversely across the slide to provide a cam surface for raising the tone arm. The cam surface connects with the end portion 60 also disposed in a horizontal plane slightly below that of the rest of the slide. The member 56 is provided with a boss 65, intermediate the bosses 57 that carries a stub shaft 66 on which the eccentric wheel 67 is journalled. The wheel 67 is held to the stub shaft by a shoulder screw 68 which engages the underside of a hub 69 on the wheel. The wheel is thus rotatably journalled on the stub shaft 66 and as previously stated is eccentrically disposed relative to the hub. The eccentric wheel as best shown in Fig. 3 may comprise complementary parts which may be secured together in any suitable manner, each part being provided with an offset portion 71 at its periphery. The offset portions after the parts are fastened together securely clamp a friction ring 72 which forms the rim of the wheel. The ring may be of rubber, fiber or other material.

The operation of the apparatus is effected by the sliding of the slide 55 on the ways 47 and the slide is slid on the ways by the rotation of the eccentric wheel 67 which is driven by the hub 45. As best shown in Figs. 3 and 11, the hub 45 and the rim 72 of the wheel 67 are normally disposed in spaced relation from each other during the playing of a record. To maintain this relation the body of the wheel is provided with an upstanding lug 75. This may be provided as a separate piece spot-welded to the wheel or may be made integral by striking up a tongue from the wheel itself. This lug is engaged by a stop which comprises a roller 76 carried on the end of a trip link 77. The roller may be provided with a rubber rim or the lug may have a rubber facing thereon to eliminate noise.

The link 77 is connected to the tone arm and operated thereby as will hereinafter be more fully described. The roller 76 is carried on a pin 75′ which extends through an elongated slot 78 in the slide. The roller is of greater diameter than the width of the slot and is assembled in the slot through an enlarged circular opening 78′ in the end of the slot.

Secured to the end of the stub shaft 66 by the screw 68 is a lever 80, Fig. 3, which carries a downwardly extending pin 81. The member 81 is provided with a groove 82 adjacent its end, in which is secured the end of a helical spring 83. The other end of the spring is likewise secured to a pin 84 carried by the wheel 67. In the position shown in Fig. 11 the spring 83 being under tension is tending to rotate the wheel 67 in the direction of the arrow. The rotation of the wheel 67, however, is prevented by the lug 75 which is in engagement with the roller 76 carried on the link 77. When the roller 76 is withdrawn from its contact with the lug 75, as shown in Fig. 12, the wheel is released and the spring 83 rotates the wheel into contact with the hub 45, which in turn is being rotated by the turntable. This position is shown in Fig. 12. The hub 45 then drives the wheel through the frictional engagement therewith, and since the wheel is eccentrically mounted, rotation thereof causes the slide to be moved to the right as viewed in the figures. The slide reaches the greatest extent of its movement when it attains the position shown in Fig. 13, where the wheel reaches its greatest point of eccentricity.

The movement of the slide on the ways is effected against the pressure of a helical spring 86 which is disposed about one of the rods 47, one end of the spring being in engagement with a washer 87 carried on the rod and which washer in turn abuts the leg 48 (Fig. 3) depending from the base of the pedestal 35. The other end of the spring engages the boss 57 on the bracket 56. The spring 86 therefore always urges the slide and the wheel toward the hub 45 or in the opposite direction shown by the arrow 90 in Fig. 12. After the eccentric wheel reaches the position in Fig. 13 it continues in its rotation, the spring 86 pushing the slide back and maintaining the contact between the hub 45 and the friction rim 72 until the wheel again attains the position shown in Fig. 11.

A stop 91 is disposed on one of the rods 47 and adjustably secured in place by a set screw to limit the movement of the slide 55 by the spring 86 toward the housing 15. This stop also determines the clearance between the hub 45 and the eccentric wheel rim 72 during the playing period. Although but one spring 86 and its cooperating parts are shown for urging the slide toward the housing 15, it will readily be seen that two such springs could be provided, one around each rod if desirable.

As previously stated the pedestal 35 extends upwardly and may be of hollow conformation, as best shown in Fig. 3. It is provided with a base 40 which extends toward the turntable and which carries a vertically extending bored boss 93 in which a bearing sleeve 94 is immovably secured by a press fit. A tone arm support is rotatably journalled in the sleeve 94 and comprises a sleeve 95 which extends in rotatable relation through the bearing 94. Secured to the sleeve 95 above and resting on the bearing 94 is the tone arm support head which comprises a collar 96, which may be secured immovably relative to the sleeve 95 by a set screw. The collar 96 has staked thereon the tone arm support bracket 97. The bracket is provided with a pair of flexible side arms 98 that have laterally extending pins 98′ which extend into openings in the parallel side walls 99 of the tone arm 41, the tone arm being substantially inverted U-shaped in cross section. The tone arm is thus pivoted for vertical movement on the arms 98 and may swing horizontally by rotation of the bracket and sleeve 95. The lower end of the sleeve 95 extends through the bottom of the sleeve bearing 94 and has secured thereon a lever 101. The lever 101 is provided with a collar which is secured to the sleeve 95 by a set screw, and has arms, one of which is operated by the cam slide and the other which controls the movement of the stop or trip for the eccentric wheel. A tone arm lifting rod 103 is slidably journalled in the sleeve 95, the lower end of the rod being rounded off at 105 and adapted to slide on the upper surface of the slide 55 when the slide is moved. The rod 103 extends upward through the sleeve 95 and is provided with an angularly extending portion 104 which extends out through a slot 95' in the sleeve 95. The tone arm support bracket 97 is provided with a vertically extending wall 107 that has a slot 106 through which the part 104 of the rod 103 extends. The part 104 is adapted for engagement with an adjustable stop 108 disposed in a boss 109 on the underside of the tone arm. During operation, the slide 55, in its movement toward the right as viewed in the figures, causes the rod 103 to ride up the cam surface 59, causing the rod to be raised. The end 104 engages the adjustable abutment 108 on the underside of the tone arm and raises the tone arm which pivots vertically about the pivots 98'. On the return movement of the slide, the rod 103 rides down on the lower portion 60, lowering the tone arm.

The sleeve 95 being connected to the tone arm is rotated with the tone arm, that is, when the tone arm traverses the grooves the sleeve is rotated clockwise. The lever 101 secured to the sleeve 95, as previously stated, fulfills a dual purpose. It is provided with an arm 112 which is contacted by a member carried on the slide 55 to initially rotate the sleeve and hence the tone arm to move the tone arm to one side of the turntable. The other arm of the lever is provided with a portion which extends outwardly at an angle slightly greater than 90° and then is offset downwardly at 113 and is provided with an end 114 which is pivotally connected at 115 to the trip link 77. (See Figs. 11 and 12.) The trip link 77, Fig. 4, comprises two parts, 77 and *77a*, the part *77a* being provided with upwardly extending flanges *77b* between which the end of the link 77 rides. The link 77 is provided with an upwardly extending lug 116 while the portion *77a* has a similar lug 117. The two lugs are connected together by a screw 118, the head of which engages the lug 116 and the end of which is threaded into the lug 117. A spring 119 is disposed around the screw 118 engaging the two lugs 116 and 117. The length of the link may thus be readily adjusted and the connection between the two parts permits the parts to telescope relative to each other to adjust the position of the pin 75' which carries the roller 76 in the slot 78. The part 77 is provided with a slot 120 and a rivet 121 is secured in the part *77a* and extends upward through the slot, the end being provided with a head which engages the upper surface of the part 77 to retain the two parts in proper position.

It will thus be seen that when the tone arm is rotated that movement is transmitted through the lever 114 to the link 77, the end of which is reciprocated in the slot 78 opposite the abutment 75 on the eccentric wheel 67.

The sleeve 95 extends upwardly through an opening in the top of the tone arm, and carries on its end the ejector operating lever. The operating lever includes a collar 124 which is secured to the sleeve by a screw and carries a lever 126 having an upstanding lug 127. (See Fig. 5.)

The tone arm is raised, as previously stated, by the rod 103 riding up the inclined portion 59 of the slide. The swinging of the tone arm after being raised is also affected by the slide. The slide carries a tone arm moving member or cam which comprises a plate 130 having a pair of elongated slots 131, as best shown in Fig. 14, which enables the plate to be secured to the underside of the slide by rivets 132. The plate is provided with an upstanding side wall which carries a lug 134 having a substantially vertical edge or cam face 135 adapted for engagement with the edge of the lever 112. A spring 136 connects to the slide 55 at 137, Fig. 4, and to a lug 138 on the bottom of the plate. In this manner the plate and its lug 134 are resiliently held on the slide, the ends of the slots 131 bottoming against the rivets 132. Movement of the member relative to the slide is permitted when the force exerted against the vertical edge 135 by the lever 112 is great enough to overcome the tension of the spring 136. This permits the tone arm to be moved even when the lug 134 is in engagement with the lever 112, the spring 136 allowing the member to slide on the cam slide 55 by reason of its mounting. During normal operation, when the cam slide is moved toward the position ultimately reached as illustrated in Fig. 13, the lug 134 engages the lever 112 and rotates the sleeve 95. This swings the tone arm counterclockwise clear of the turntable to permit the succeeding records to be dropped without hitting the tone arm. The rotational movement of the sleeve also carries with it the lever 126 which operates the ejector mechanism about to be described.

The pedestal 35 is provided with a seat 140 on which the ejector head is secured. The head comprises a base 141 which, as best shown in Fig. 5, is of a rectangular shape, being provided with a down-turned flange 142 at one end and an up-turned flange 143 at the other end. The flange 142 is secured in the seat 140 by screws 144, which also secure a plate 145 coincident with the flange 142 to the seat. The plate 145 and the flange 142 could be made in one part if desired. The plate 145 is provided with upwardly extending portions 146 having apertures 147 which are in alignment with apertures 148 in the flange 143. These apertures are adapted to receive rods 149 which may slide therethrough and provide means for supporting and guiding the remainder of the head. The plate is also provided with a square aperture 150 adjacent the flange 143 through which the collar 124 carrying the lever 126 may extend. The plate 141 is also provided with a pair of spaced apertures or slots 151—152 in longitudinal alignment with each other as can best be seen in Fig. 5. These apertures as will hereinafter more clearly appear are so positioned as to enable the head to be indexed in two different positions for handling either 10 or 12-inch records.

The rods 149 provide a support for a plate 155 which comprises the record ejector. This plate is of generally rectangular formation having a curved record engaging edge 156. The plate is provided with lugs 157 and 157' struck downward from the body of the plate and provided with openings through which the rods may slide, the plate thus being slidably mounted on the rods. Secured rigidly to the ends of the rods by screws 158 is a plate 159; the screws extend through the plate and are threaded into the rods 149. As can best be seen in Fig. 6 the bottom portion of the plate 159 has struck therefrom and bent inwardly two lugs 160 and 161. The plate 155 is provided with a downwardly extending lug 162 and a helical spring 163 is connected between the lug 162 and the lug 160 thus pulling the plate 155 on the guide rods 149 against the plate 159. The plate 155 and the rods 149 are slidable on the supporting base 141, the rods sliding in the openings 147 and 148, against the tension of the spring 163.

The ejector slide or carriage is adapted to be maintained in either one of two positions, one being that for operating on 10-inch records and the other for operating on 12-inch records. These positions are best shown in Figs. 7 to 10, inclusive; Figs. 7 and 8 being the position taken by the parts when 10-inch records are being played and Figs. 9 and 10 being the position taken between the parts when 12-inch records are being played. In order to maintain the proper position and lock the slide in its proper position, a lever 165 is provided (Fig. 6) which is pivotally secured to the lug 161 on the plate 159 and is provided on its extremity with a downwardly extending portion 166 adapted to extend into either one of the slots 151 or 152. This lever is also provided with an upstanding portion 167 which extends upwardly through a slot 168 in the base 155 and has an overhanging portion 169, which, as can best be seen in Fig. 5, extends laterally from the slot over the base in spaced relation thereto. A leaf spring 170 is secured by a screw 171 to the top of the plate 155 and extends under the overhanging part 169 of the lever 165, normally urging that lever upwardly.

As previously stated the ejector slide is adapted to be disposed in either one of two positions and is maintained in the desired position by the end 166 of the lever 165 being engaged in one of the slots 151 or 152. The lever is maintained in the slots by means of a second lever 173, best shown in Fig. 5, which is pivotally secured to a lug 174 by a rivet 175, the lug 174 being struck upward from the body of the plate and apertured to receive the rivet. As can best be seen in Figs. 7 and 10, the lug 174 is near the rear end of the plate 155 and the lever 173 extends forwardly therefrom. The lever is cut away at 176 to provide a seat adapted to rest on the top of the overhanging portion 169 of the lever 165. When the lever 173 is pressed downward this portion engages the overhanging part 169 and presses it downward against the pressure of the spring 170 until the lug 166 engage in either one of the holes 151 and 152, depending upon which hole the slide is over when the lever 173 is pressed downward.

The lever 173 is also provided with two downwardly extending tongues 177 and 178. These tongues are adapted to extend downward through the openings 179 and 179′ respectively in the plate 155. These tongues, as will hereinafter more clearly appear, are, one or the other, adapted to be engaged by the lug 127 on the head 124 when the sleeve 95 is rotated, and when so engaged, the plate 155 is slid on the rods 149 against the pressure of the spring 163; at this time the edge 156 of the plate engages the edge of the record and pushes it off of the support.

The means for holding the lever 173, and through it the lever 165, in its proper position is carried within the cover for the assembly. The cover, as best shown in Fig. 3, comprises a housing 172 provided with a seat 181 at its rear end and adapted to receive the upper edge of the plate 159, screws 182 extending through the plate and into threaded bosses extending inside the cover. The housing slants upwardly in the front as best shown in Fig. 3, being slotted at 183 for a lever 184 which extends through the slot and is provided with a knob 185 on the end adapted to engage the top of the record stack. The lower forward portion of the housing is provided with a shelf 186 which protrudes from the forward part of the housing. The shelf is curved to follow the configuration of the edge 156 of the slide 155 and also slants backward towards its underside as can best be seen in Fig. 3. Just above the shelf the housing is slotted at 187 to permit the forward end 156 of the slide to extend and reciprocate therethrough. The bottom of the slide is juxtaposed to the top of the shelf 186.

The housing 180 is provided in its underside Fig. 15 et seq. with a downwardly extending boss 190. The boss is slotted transversely at 191 and a lever 192 is pivotally journalled in the slot 191 on a pin 193 which in turn is disposed in a groove extending at right angles to and crossing the slot 191. The lever and the pin are held in the slot by a strap 194 which is secured to the boss by screws 195. The lever may thus be rocked in the slot but is held from escaping therefrom by the clamp or strap 194. The rear end of the lever is provided with a laterally extending portion 196 extending toward the mid-portion of the housing and adapted to rest on the top of the lever 173 opposite the narrow portion 176. (See Fig. 3.) This part 196 is spaced from the top of the housing and is held in a downward position by a leaf spring 197, the spring being secured to the boss 190 by the screw 195 which goes through the strap 194 and the extremity of which presses on the part 196. Pressure is thus normally maintained on the lever 173 holding it and the lever 165 in their lowermost positions against the pressure of the leaf spring 170. The lever 184 is pivotally supported by a pivot pin 198, which is journalled in a slot 199 extending transversely of the housing in a boss 200 on the underside of the housing, as can best be seen in Figs. 3 and 15. The lever 184 is provided with an extension 201 that is engaged by the other end 202 of the leaf spring 197, which spring normally forces the lever in counterclockwise direction as viewed in Fig. 3. The springs 197—202 could be made of separate springs if desired. The ball 185, which may be of rubber or other resilient material, is held against the top of the record stack, holding the records against accidental displacement from the shelf 186.

The end of the lever 192 toward the front of the housing is provided with a lateral extension 203 which extends adjacent to but spaced from the top of the housing under the slot 183. A leaf spring 204 also secured by the screw 195 on the boss 190 extends upward and engages the underside of the part 201. There is thus two springs operating on the lever 192, 197 urging it downward on one end and 204 urging it upward on the other end. The lever 184 is provided with a lug 205 extending upward at substantially right angles from the extension 201. When the lever 184 is raised the lug 205 rotates with the lever about the pivot until the lug rests on the top of the angular extension 203 of the lever 192. At the same time the end 201 of the lever 184 rides over the apex formed by the bend in the spring 202 onto the end, and the lever is thus held in an upright position, allowing the free access for placing records onto the shelf 186 or for removal of the played records from the turntable. This condition is best shown in Fig. 16. When the lever 184 is moved to this position the lever 192 is rotated slightly, releasing some of the pressure on lever 173 which may pivot slightly but not sufficiently to cause disengagement of the lever 165 from its slots. Interposed between the bosses 190 and 200 is a flat spring 207, the spring may be set in undercuts in the bosses 190 and 200. The spring bridges the slot 183 and the lever 184 is provided, above the lug 205, with a notch 210. In the position shown in Fig. 16 the lever is tending to be rotated by the end of the spring 202 bearing against the point 201. Further rotation is prevented, however, by the spring 207 the end of which engages in the notch 210. The further rotational movement of the lever 184 against the pressure of the spring 207 in the notch 210, causes the spring to bow downwardly as shown in Fig. 17, allowing the lug 205 to engage the lateral extension 203 of the lever 192 and rotate it counterclockwise lifting the end 196 off of the lever 173. When this occurs the spring 170 forces the levers 165 and 173 upward, disengaging the part 166 of the lever 165 from the hole 151 or 152, wherever it happened to be engaged at that time, and releasing the slide so that it may be moved to its alternate position. This also pivots the lever 173 so that the ends 177 and 178 are free from engagement with the lug 127 on the head 124, and the head may be freely slid to its alternate position.

It will be noted that the movement of the tone arm to one side of the turntable is effected by the member 134 which engages the lever 112 carried by the sleeve 95. It will also be noted that the rotation of the sleeve causes the collar 124 and its associated lever 126—127, to also be rotated in counterclockwise direction. As previously stated the lug 127 is adapted to engage either one of the tongues 177 or 178 depending upon the relative position of the plate and carriage 155 on the ejector bed 141. This engagement is effected after the tone arm is raised and swung sufficiently far to one side of the turntable to allow clearance space for the records to be dropped. The member 134, however, moves the lever 112 farther than is necessary to effect clearance space for dropping of the records and this additional movement is utilized to effect the release of a new record from the stack onto the turntable. Just before the cam slide reaches the limit of its movement, the lever 127 engages with one of the tongues 177 or 178, depending on the position to which the head is set. Continued movement of the lever 127 slides the slide 155 against the pressure of the spring 163 away from the plate 159 (see Fig. 8) on the rods 149, the curved end 156 of the slide sliding through the slot 187 and engaging the edge of a record to shove it off of the shelf 186.

This movement, so far described, is effected positively by the lug 134 contacting the lever 112 on the sleeve 95. The return movement of the arm is effected by the ejector; the spring 163 pulls the plate 155 back toward the abutment plate 159, and this movement is transmitted from the tongue 178 or 177 through the lever 126 to the sleeve and thence to the tone arm. The positions of the tongues 177 and 178, therefore, also determine the return of the tone arm to playing position. Adjustment of the return position may be effected by the set screw which holds the collar 124 in place on the sleeve 95.

When the tone arm is returned to playing position because of the action of the ejector slide, means is provided to prevent overtravel of the tone arm and jumping of the needle in the grooves as it is lowered. This means is best shown in the bottom plan view in Fig. 22 and the end view in Fig. 23 and is effected by means of a lever 220 which is secured to the rod 103 above the end 105. This lever rotates with the rod 103 which rod rotates with the sleeve 95. The lever is provided with the upstanding pin 222. Secured on a boss 223, on the side of the housing 35, is a lever 224 (Fig. 22) of thin flexible metal. This lever is disposed above the path of travel of the pin 222 on the rod, when the tone arm is in its normal playing position. A spring 225 connected to the end of the lever and to the other side of the housing, pulls the lever toward and against the bearing sleeve 94, which limits the movement of the lever. As the tone arm moves in while playing a record, the arm 220 is moved counterclockwise as viewed in Fig. 22, until it ultimately reaches the position at the end of the playing of the record, shown by the dotted lines, where the pin 222 is directly under the lever 224. When the slide raises the rod 103 the pin 222 and the lever 220 rise with the rod and the end of the pin engages the underside of the flexible lever 224 which bends upward. It will be remembered that this occurs as the first movement of the cycle when the pickup arm is lifted off of the record. As the tone arm is moved outward, this being the next movement of the cycle, the pin 222 which is traveling in an arcuate path, now clockwise as viewed in Fig. 18, slides across the under surface and slips off the edge of the lever 224, allowing the lever to spring back to its normal position to one side of the pin, which is on the side in the path of travel of the pin 222 when the tone arm is moved inward after ejection is effected. This is further shown in full lines in Fig. 22. A spring 226 is disposed about the rod 103 between the arm 220 and the lever 101, assuring that the rod 103 and its attached parts return to their lower position. When the ejector spring returns the tone arm to the approximate playing position the pin 222 engages the edge of the lever 224, moving it against the pressure of the spring 225, this spring being weaker than the spring 163 in the ejector head. This holds the tone arm from accidental overtravel which might otherwise occur due to the fact that lug 134 is no longer in contact with the lever 112 and assures that the tone arm will be lowered into its proper position in the record playing groove.

In operation a plurality of records are stacked on the spindle 25 the upper offset portion 30 of the spindle extending through the holes and the lowermost record resting on the shoulder 29. The edges of the record rest on the shelf 186 of the ejector. One record is ejected from the stack to place the same on the turntable by the simple expedient of lifting the tone arm and moving it outward. It being assumed that 10-inch records are being played, the ejector slide has been moved to its forward position by raising the lever 184 to its greatest extremity, which withdraws the lug 166 from the index holes 152 and permits the slide to be slid forward and then the arm lowered. The lug 166 is then in the opening 151. Lowering of the lever 184 causes the ejector to be locked into the proper position. The ball 185 on the lever 184 engages the uppermost record of the stack and holds the record on the support against accidental displacement. The record playing is started by energizing the motor 18 which drives the turntable 11 to play the record which is reproduced in any well known manner by means of the pickup and an amplifier.

When the needle reaches the runout groove near the center of the record, the tone arm will have moved toward the spindle, from the position shown in Fig. 11, to the position shown in Fig. 12. At this time the trip roller 76 is withdrawn from engagement with the lug 75 on the eccentric wheel, and the spring 83 causes the wheel to be rotated with its periphery into engagement with the serrated driving hub 45. Since the wheel is rotated by the rotating hub 45 and is eccentrically mounted, the slide will be moved in the direction of the arrow 90 in Fig. 12. As the slide 55 is moved to the right, as shown in Fig. 4, the cam surface 59 engages and raises the rod 103 which raises the pickup arm. At this time the pin 222 hits against the lever 224 bending it upward. Further movement of the slide to the right causes the face 135 of the upstanding lug 134 on the slide 130 to engage with the lever 112, moving the tone arm outward counterclockwise free of the turntable. As the pickup arm is moved outward, the lever 126 on the sleeve 95 is also moved, the lug 127 contacting with the tongue 178 on the lever 173. This lever, being connected to the ejector slide, moves the slide outward through the slot 187 until it engages the edge of the record and shoves it off the spindle shoulder 29 and the shelf 136. Thereupon the record drops down onto the turntable into playing position. By this time the eccentric wheel has reached its farthest position as shown in Fig. 13, where the slide is moved to the limit of its movement and the spring 86, which holds the eccentric wheel against the hub 45, attains its greatest degree of compression. Continued movement of the wheel causes the slide to be returned towards the original position by the spring 86, withdrawing the lug 134 from contact with the lever 112.

During the extremity of the movement, the position taken by the parts in the ejector head is as shown in Fig. 8, where the ejector slide had moved on the rods 149 against the pressure of the spring 163 away from the plate 159. When the member 134 moves away from the lever 112, the ejector slide is released and the spring 163 pulls the slide back to the position shown in Fig. 7. This pressure is also transmitted through the tongue 178 and lever 126 to the sleeve 95 rotating the tone arm to its playing position above the turntable. As previously stated the pin 222 had slipped out from underneath the lever 224 and the lever is now in the return path of the spring, pressing against the pin 222, preventing overtravel of the tone arm by the action of the slide and assuring that it will not move inward an indeterminate amount due to inertia. The eccentric wheel continues its rotation, the slide returning in its travel, until the rod 103 slides down the cam 59 onto the lower portion 60; at this time the pin 222 is withdrawn from contact with the lever 224 and the tone arm is lowered gently onto the record in proper playing position. The record is then played, in the manner previously described, until it reaches the runout groove whereupon this cycle is repeated.

In the event that it is desired to play 12-inch records the ejector mechanism is moved from the position shown in Figs. 7 and 8 to the position shown in Figs. 9 and 10. This is effected by raising the lever 184 which causes the disengagement of the lever 166 from the hole 151, after which the housing may be slid rearwardly, the lever 184 released, and the lug 166 is then engaged in the opening 152 and the mechanism is then located in position for playing 12-inch records.

It will be noted that the ejector head just described is operated by lifting the lever 184 and sliding the head to the desired position for handling either 10 or 12-inch records. In Figs. 18 to 21, I have illustrated a modified form of head wherein the adjustment for 10 or 12-inch records is made by turning the head 180°. This has certain advantages in compactness, economy and simplicity of manufacturing which will become apparent as the description proceeds.

Since the mechanism up to the point where the head is attached is substantially the same, the description will not be repeated. In this instance the fixed base plate 141 of the previous embodiment is replaced by a plate 230 which is of substantially rectangular formation and is provided with a downwardly bent flange 231 and is secured to the pedestal 35 by screws 232 in a manner similar to that previously described. Seated on top of the plate 230 is a movable base plate 233 which comprises a substantially rectangular flat intermediate portion having the longitudinal sides bounded by flanges 234. This plate is pivotally secured to the plate 230 by a connection which permits the plates to be moved away from each other and from interlocking relation therewith, and rotated 180° to an alternate position. The position shown in Fig. 20 is for playing 12-inch records. This connection is effected by providing an opening 235 intermediate the ends of the plate 230 and a similar opening in the plate 233. A stud having a shank 237 extends through the openings and is provided with a head 238 which engages the bottom surface of the plate 230. A pair of bent spring washers 239 are disposed on the shank 237 and a locking ring 240 disposed on the reduced end of the shank holds the washer and stud in position in the plates, the reduced end being staked over to hold it in place. It will be seen that by means of this connection the plate 233 may raise upward relative to the plate 230, the spring washers 239 flattening out when the plate is raised.

Equally spaced from the pivot point and on diametrically opposite sides in the plate 230, are provided apertures 241. These apertures cooperate with projections 243 on the plate 233 to hold the two plates locked together and against movement under pressure of the springs 239, when the plate 233 is resting on the top of the plate 230. It will thus be seen that when the plate is rotated 180° the projections 243 engage with the edges of the apertures 241 and the projections raise out of the apertures the spring 239 compressing.

The sleeve 95 extends upward in alignment with the pivot just described. The end of the sleeve terminates just below the pivot and is provided with an arm 244 which is movable below the plate 230 and carries a short lug 245 that extends through an opening 246 in the plate 230 which opening is of conformation to permit free movement of the pin 245 therein when the sleeve 95 is moved. The plate 233 is also provided with a pair of openings 247 and 248. The opening 247 being above the pin 245 when the device is adjusted for 12-inch records as shown, and the opening 248 being above the pin when it is rotated 180° for playing 10-inch records. The openings are of sufficient size and so placed to permit the pin to swing therein and to perform the function about to be described.

The base 233 supports two ejector plates which are each operated by the pin 245. The plate 249 is substantially L-shaped, having a curved surface 250 for engaging the record and being provided with three elongated slots 251. This plate is held onto the base 233 by rivets 252 extending loosely through the slots and secured in the plate 233. The other plate 253 is also substantially L-shaped being disposed on the other end of the base 233 and secured thereon in a like manner. The two plates are held inward from the edge of the supporting plate 233 and towards each other by a spring 254 secured to the lugs 255 and 256 on the plates 249 and 253, respectively.

The plate 249 is provided with an upstanding lug 257 and the plate 253 with a similar lug 258 disposed on the end which extends adjacent to the sides 234; these lugs are adapted to be contacted by an adjusting screw 259 and 260 respectively, which are threaded through lugs 261 and 262 struck upward from the plate 233, to permit adjustment of the plates and limit the movement of the plates by the spring. This permits a means for adjusting the return travel of the tone arm when a record has been changed to determine its position when it is lowered into the playing groove, this portion of the operation being in substance the same as described for the preceding embodiment.

The plate 249 is provided with a downwardly bent lug 263 which is adapted to extend downward into the opening 247 for contact with the pin 245. The plate 253 is likewise provided with a lug 264 for contact with the pin 245 when the head is adjusted for playing 12-inch records. The base 233 is provided with pairs of record supporting projections 266 and 267 on opposite ends, each pair being designed to support a stack of 12 or 10-inch records respectively.

A cap 265 covers the assembly and may be secured thereto by screws, not shown, which extend through the sides of the cap into the walls 234 of the part 233 or it may have a suitable friction grip therewith. The material of the cap is cut away at 268 and 269 to provide slots for allowing the slides 249 and 253 to slide out therethrough and engage the edge of a record disposed on the projections 266 and 267. The mid-portion of the cap is provided with a rectangular opening 270 having upwardly extending walls 271 on opposite sides. The mid-portion of the top of each wall is provided with a semi-circular notch in which is seated a member 272 which is provided with an offset center portion 273. A record engaging holddown lever is fixed to the ends of the member 272, which ends extend beyond the walls 271, and comprises a pair of arms 277 which curve toward and meet each other at 278 and carry a ball 279 adapted to rest on the uppermost record of a stack. The front and rear edges of of the opening are provided with downwardly extending lugs 274 which provide a support for a rod 275 which also bridges the opening. A spring 276 engages the crank portion and the rod 275. It will thus be seen that the spring 276 tends to rotate the holddown lever.

In operation, the shaft 95, when the tone arm has cleared the table, rotates the arm 244 and swings the pin 245 causing the lug 245 to engage the lug 263 on the slide 249, pushing the slide out in the slot and engaging the edge of the record and pushing it off the shelf 266. The spring 254 returns the tone arm by pressure of the lug 263 against the pin 245 which in operation is substantially the same as that described for the previous embodiment. As previously stated the return of the tone arm can be controlled by the adjustment of the screw 259.

When it is desired to play 12-inch records the cap is rotated and the detent rides out of the apertures and the plate is raised which compresses the springs 239 allowing the plate 233 to be raised off of the supporting plate 230, disengaging the projections 243 from the holes 241, after which the head may be rotated 180° and lowered into position. In this case the operation is exactly the same as described except that the slide 253 pushes the records off the shelf 267.

It should be particularly noted that because of the manner of connection of the slide 130 which carries the lug 134 to the cam slide 55, this member having a spring connection therewith, that any interference with the tone arm during the record changing cycle does not tend to bend, displace or break parts such as heretofore has been a common occurrence with many record changers.

A still further advantage resides in the fact that the ejection of the records is effected by member 134 engaging the arm or lever 122 which, through the sleeve 95, operates the ejector for ejecting the records from the stack. Ordinarily if a record becomes jammed, as in prior mechanisms, it either breaks the record or throws the mechanism out of adjustment. In this case, however, if the slide meets with any predetermined resistance to its movement, such as it might meet if the record was not properly placed on the supports the spring 136 permits the operating member 134 to slide relative to the slide 55 and no damage is done. In this case the operator will note that the same record is being played twice and can remedy the difficulty. This also applies when the ejector slide reaches the end of its movement. That is, if the slide reaches the end of its movement before the cam slide has reached the limit of its movement, this connection permits relative movement between the cam slide and the lug 134 without affecting its adjustment.

It should also be noted that because of the tone arm being connected to the sleeve 95 that it is possible to eject undesired records manually from the supports by simply moving the tone arm to its outermost position which rotates the sleeve 95 and operates the ejector slide.

Another feature resides in the means for cooperating with the tone arm to hold the tone arm when the apparatus is not being operated to prevent accidental damage to the tone arm and its pickup means As best shown in Figs. 1 to 2*a*, a bracket 201 is provided spaced from the pedestal 35. This bracket comprises an essentially U-shaped member having legs 202 and 203 and a connecting wall 204. As previously mentioned the tone arm is capable of independent movement because of the manner of connection with the cam slide. Therefore it can be lifted and seated, as shown in Fig. 2*a*, on the bracket at any time. The bracket is so oriented relative to the rest of the apparatus that when the tone arm is placed in this non-playing position the spring in the ejector mechanism is exerting a pressure on the tone arm which pressure holds the side of the tone arm against the leg 202 and there is sufficient frictional engagement to prevent accidental displacement even though the machine is being moved.

It has also been shown that because of the simplicity of the mechanism certain economies in manufacture result therefrom; and that even though simple, the mechanism is extremely sturdy and not subject to the frequent disalignment of parts which makes it necessary to call a serviceman to readjust the same. Being small and compact it is possible to install the same in existing cabinets where, very often, space for installation of an automatic changer is at a premium. Because of the frictional drive and its simplicity, gear noises normally present in record changers are completely elminated and the entire mechanism is extremely simple, smooth, fast and quiet in its operation. Because of the construction and the relatively few moving parts, lubrication periods are infrequent.

Having thus described my invention I am aware that numerous and extensive departures may be made therefrom without departing from the spirit or scope of the invention.

I claim:

1. A record changer mechanism comprising a record support and ejector for supporting a stack of records above a turntable and ejecting them singly onto the turntable, said support having a mounting base for mounting it on a panel or the like, a pair of slideways carried by said support and extending outwardly therefrom in spaced parallel relation, a spindle housing carried on the ends of said slideways in spaced relation from said support, a turntable supporting spindle rotatably journalled in said spindle housing, a turntable carried by said spindle and rotatable therewith, drive means carried by said spindle below the turntable, record releasing mechanism carried by said support, and means journalled on said slideways between the supports and spindle housing adapted to be connected to and driven from said drive means and connected to said record releasing mechanism to control the operation thereof.

2. A record changer including a rotatable spindle and a turntable carried thereby, a record support and ejector for supporting a stack of records and ejecting them one at a time onto said turntable and including a record ejecting mechanism and means for operating the same including a lever, means for moving said lever including a reciprocatory means operatively connected to and operated by said spindle, an abutment carried by said reciprocatory means and adapted to be moved into contact with said lever, and spring means operatively connecting said abutment to said reciprocatory means and operable upon said abutment meeting predetermined resistance in said lever to permit relative movement between the reciprocating means and the abutment.

3. A record changer mechanism comprising a record support, means carried by the record support for ejecting records singly therefrom, operating means for said ejector including a rotatable shaft and a lever carried thereby, a spindle support and a spindle rotatably carried thereby and having a turntable thereon, a pair of guide ways connecting said spindle support and said second support in fixed spaced relation, a slide member slidably journalled on said guide ways, and means for reciprocating said member on the guide ways, said slide member having a lever operating cam slidably carried thereby, and spring means connected to the cam and slide member to hold the cam in a predetermined position on the slide member, to hold the cam in a predetermined position on the slide member, said cam adapted upon reciprocation of the slide member to operate said shaft lever and said spring connection between the slide member and the cam permitting independent movement of the slide and cam upon the cam meeting predetermined resistance from said ejector lever.

4. A tone arm control and record releasing mechanism comprising a turntable and means to rotate the same, a spindle for supporting the turntable and having a drive hub disposed thereon below the turntable, a bed, a carriage slidably carried by the bed, a driven member carried by said bed and comprising a wheel eccentrically mounted thereon and adapted for cyclic driven engagement with said hub, a cam member slidably disposed on the carriage and spring means connecting said cam to the carrage, a tone arm support for swinging the tone arm and provided with a lever for engagement with said cam, said spring means permitting movement of the cam relative to the slide when the tone arm meets with a predetermined resistance to allow the slide to move independently of the tone arm.

5. An apparatus of the class described including a pair of guide ways, a carriage disposed on the guide ways, a means for reciprocating said carriage on the guide ways comprising a drive member on the turntable spindle, a driven member rotatably carried by the carriage and eccentrically disposed on its axis, a pickup arm swinging cam slidably disposed on the carriage and spring means for holding the cam in one position, a pickup arm lever disposed in the path of travel of the cam and adapted to contact therewith when the carriage is moved, said cam adapted to move against the pressure of said spring when the pickup arm lever meets with opposition or is moved against said cam with a predetermined pressure.

6. A record changer including a rotatable spindle and a turntable carried thereby, a record support and ejector for supporting a stack of records and ejecting them one at a time onto said turntable, a pickup arm, means for supporting said pickup arm, and means for operating said record ejector including a reciprocatory means operatively connected to and operated by said spindle, a spring secured cam carried by said reciprocatory means and a lever carried by said pickup arm support means, said lever adapted to be contacted by said spring secured cam to move said pickup support means, and thereby to swing the pickup arm outwardly, said record ejecting mechanism being operated by said pickup arm support and having spring means for swinging said pickup arm inwardly, and a second spring lever cooperating with said pickup arm support to hold said support against overtravel upon the inward swing of said arm.

7. In a record changer mechanism including a turntable for rotating records to be played, a tone arm for cooperation with records on the turntable to play the same, means for supporting a stack of records above said turntable and including rejector means for ejecting the records one at a time onto the turntable, means for moving said tone arm outwardly only to one side of the turntable and having an extension connected to said ejector means for operating said ejector, and spring means on said ejector to return it to normal position, said tone arm being positively connected to said operating means so that manual movement of said arm is effective to operate said ejector means, and means disposed to one side of the turntable so positioned that the tone arm may be engaged thereby and when so engaged causing said spring to be under tension to hold said tone arm in frictional locking engagement therewith.

8. A record changer comprising a spindle support, a turntable carried by said spindle, a record supporting member carried by said spindle support, a second record supporting member disposed to one side of the turntable, and an ejector mechanism carried thereby, a pair of guide rods extending between said side support and said spindle support, a cam carriage disposed on said guide rods and including spaced bearing members journalled on the guide rods and a frame carried thereby, means carried by said carriage adapted for engagement with said spindle for moving said carriage, and cam means on said carriage for operating the pickup arm and including a cam surface for raising the pickup arm and a second cam slidably disposed on said carriage and spring means holding said slidable cam in predetermined position relative to the carriage for swinging said pickup arm, a support for swingably supporting the pickup arm and a lever carried thereby adapted for operation by said slidable cam and an extension for said pickup arm support extending into operative engagement with said ejector mechanism for operating the ejector mechanism upon predetermined swinging of the pickup arm.

9. A record changer mechanism of the class described comprising a record support and ejector housing, a record support and ejector carried by the housing, a turntable spindle support and a turntable spindle and turntable rotatably carried thereby, means connecting said record support to said spindle support and formed to provide guide ways, a cam carriage reciprocably disposed on the guide ways, means carried by the carriage and operably connected to said spindle to reciprocate the carriage, means for operating said ejector journalled in said housing and including a hollow member rotatable in the housing and having a lever on the lower end, cam means on said cam carriage disposed for engagement with said lever, adapted to rotate the same, a pickup arm carried by said hollow member, said hollow member extending through said arm and being formed with a slot, a push rod disposed in said hollow member and having a part extending outward through said slot for engagement with said pickup arm and cam means on said carriage adapted upon reciprocation of the carriage to engage and raise said push rod.

10. A record ejector mechanism for an automatic record player having a turntable, a fixed record support for supporting records above the turntable and operating means disposed below the turntable, comprising a support disposed to one side of the turntable, a base carried by said support and provided with guide ways extending above the base, a carriage journalled in said guide ways and movable to alternate positions on said base, means on said carriage adapted for selectively locking the same in alternate positions on the base, said carriage including a pair of guide rods and an abutment plate carried on one end, an ejector slide reciprocably journalled on said guide rods, and spring means for holding said slide against said abutment plate.

11. In combination with a record changer having a turntable and a pickup arm, means for supporting the record above the turntable and discharging them one at a time onto the turntable including a support and base disposed at the side of the turntable, an ejector guide member, and pivot means extending through said base and said guide member for locating said guide member on said base, abutment means on said pivot means spring means engaged between said abutment means and said guide member to hold said guide member resiliently against the base and to allow movement of said guide member longitudinally of said pivot means, cooperating means on said member and base for locking said member on said base when it is moved to predetermined alternate positions, a pair of ejector members slidably disposed in said guide member, means connecting said members to said guide member for limited movement thereon, and means extending through said base and guide for cooperation with at least one of said ejectors to move the ejectors on the guide.

12. An automatic record changer and player including a turntable and rotatable supporting means therefor, a stationary support for supporting records at their centers above the turntable, a side support for supporting records at their edges disposed to one side of the turntable, means for operating said mechanism comprising a carriage disposed below the turntable and driven means disposed on the carriage for moving said carriage, a pickup arm, means for supporting said pickup arm including means for swinging the arm to one side of the turntable and having a lever carried thereby, said carriage supporting a cam member and spring means connecting said cam member to the carriage for moving it with the carriage into contact with said lever, said side support including a member disposed to one side of and above said turntable and having a seat formed thereon for supporting the edge of a stack of records, ejector means disposed on and guided by said side support for sliding the bottom record of a stack off of the seat, spring means connected to said ejector means to normally hold it out of contact with the edge of a record, and means for operating said ejector means connected to said tone arm swinging lever and operable upon a predetermined amount of swing of the tone arm to eject a record from a stack, said spring means for said ejector means being operable to cause said ejector means to swing said tone arm when said cam member is withdrawn from contact with said tone arm lever.

WILLARD J. FAULKNER.

REFERENCES CITED

The following references are of record in the file of this patent:

UNITED STATES PATENTS

| Number | Name | Date |
|---|---|---|
| 1,469,152 | Boumphrey | Sept. 25, 1923 |
| 1,938,810 | Collison et al. | Dec. 12, 1933 |
| 1,991,005 | Whitman | Feb. 12, 1935 |
| 1,993,073 | Nystrom | Mar. 5, 1935 |
| 2,026,820 | Bryant | Jan. 7, 1936 |
| 2,300,668 | Habegger | Nov. 3, 1942 |
| 2,331,383 | Faulkner | Oct. 12, 1943 |
| 2,357,520 | Kahl | Sept. 5, 1944 |
| 2,360,847 | Burnham | Oct. 24, 1944 |
| 2,395,026 | Weaver | Feb. 19, 1946 |
| 2,397,932 | Erwood et al. | Apr. 9, 1946 |

FOREIGN PATENTS

| Number | Country | Date |
|---|---|---|
| 352,980 | Great Britain | July 13, 1931 |
| 545 956 | Great Britain | June 19, 1942 |